United States Patent
Panuganti et al.

(10) Patent No.: US 9,479,664 B2
(45) Date of Patent: Oct. 25, 2016

(54) USE OF RESOURCE SERVER FOR IMAGING DEVICE APPLICATION PAYLOAD

(71) Applicant: Hewlett-Packard Development Company, L.P., Houston, TX (US)

(72) Inventors: Surender Panuganti, Bangalore (IN); Kiran Kumar Subramanya Dusi, Bangalore (IN); Scott Starks, San Jose, CA (US); Christophe Baubert, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/763,882

(22) PCT Filed: Jan. 31, 2013

(86) PCT No.: PCT/US2013/024099
§ 371 (c)(1),
(2) Date: Jul. 28, 2015

(87) PCT Pub. No.: WO2014/120196
PCT Pub. Date: Aug. 7, 2014

(65) Prior Publication Data
US 2015/0365551 A1 Dec. 17, 2015

(51) Int. Cl.
*G06F 3/12* (2006.01)
*H04N 1/00* (2006.01)
*H04L 29/08* (2006.01)

(52) U.S. Cl.
CPC .......... *H04N 1/00938* (2013.01); *H04L 67/04* (2013.01); *H04N 1/00244* (2013.01); *H04N 1/00344* (2013.01); *H04N 1/00424* (2013.01); *H04N 1/00503* (2013.01); *H04N 1/00973* (2013.01); *H04N 2201/001* (2013.01); *H04N 2201/007* (2013.01); *H04N 2201/3298* (2013.01)

(58) Field of Classification Search
None
See application file for complete search history.

(56) References Cited

U.S. PATENT DOCUMENTS

| | | | | |
|---|---|---|---|---|
| 9,197,692 B2 * | 11/2015 | Chor | ............... | G06F 17/30879 |
| 2003/0026254 A1 | 2/2003 | Sim | | |
| 2008/0244057 A1 * | 10/2008 | Kojima | ............ | G06F 8/61 709/223 |
| 2011/0022986 A1 * | 1/2011 | Dumais | ............ | G06F 8/60 715/835 |
| 2011/0276986 A1 | 11/2011 | Kamath | | |
| 2011/0286016 A1 | 11/2011 | LaVigne | | |
| 2012/0019867 A1 | 1/2012 | Prati | | |
| 2012/0036225 A1 * | 2/2012 | Chor | ............ | H04L 67/02 709/219 |
| 2012/0154842 A1 | 6/2012 | Hori | | |
| 2012/0260330 A1 * | 10/2012 | Zlatarev | ............ | G06F 21/33 726/10 |
| 2012/0290679 A1 | 11/2012 | Steinhauer | | |
| 2012/0303740 A1 * | 11/2012 | Ferris | ............ | G06F 17/30194 709/217 |

FOREIGN PATENT DOCUMENTS

KR 20130070663 A * 6/2013
WO WO-2011002777 A2 1/2011

OTHER PUBLICATIONS

Canon, imageRUNNER ADVANCE Networking Technologies: Jan 11, 2013, http://www.canon.com/technology/canon_tech/explanation/ir.html.

International Search Report and Written Opinion received in PCT Application No. PCT/US2013/024099, mailed on Jul. 31, 2013, 11 pages.

* cited by examiner

*Primary Examiner* — Dung Tran

(74) *Attorney, Agent, or Firm* — HP Inc Patent Department

(57) ABSTRACT

In one example, at least a portion of a payload for web application installed on a web server is stored by a networked imaging device on a networked resource server.

17 Claims, 12 Drawing Sheets

FIG. 8

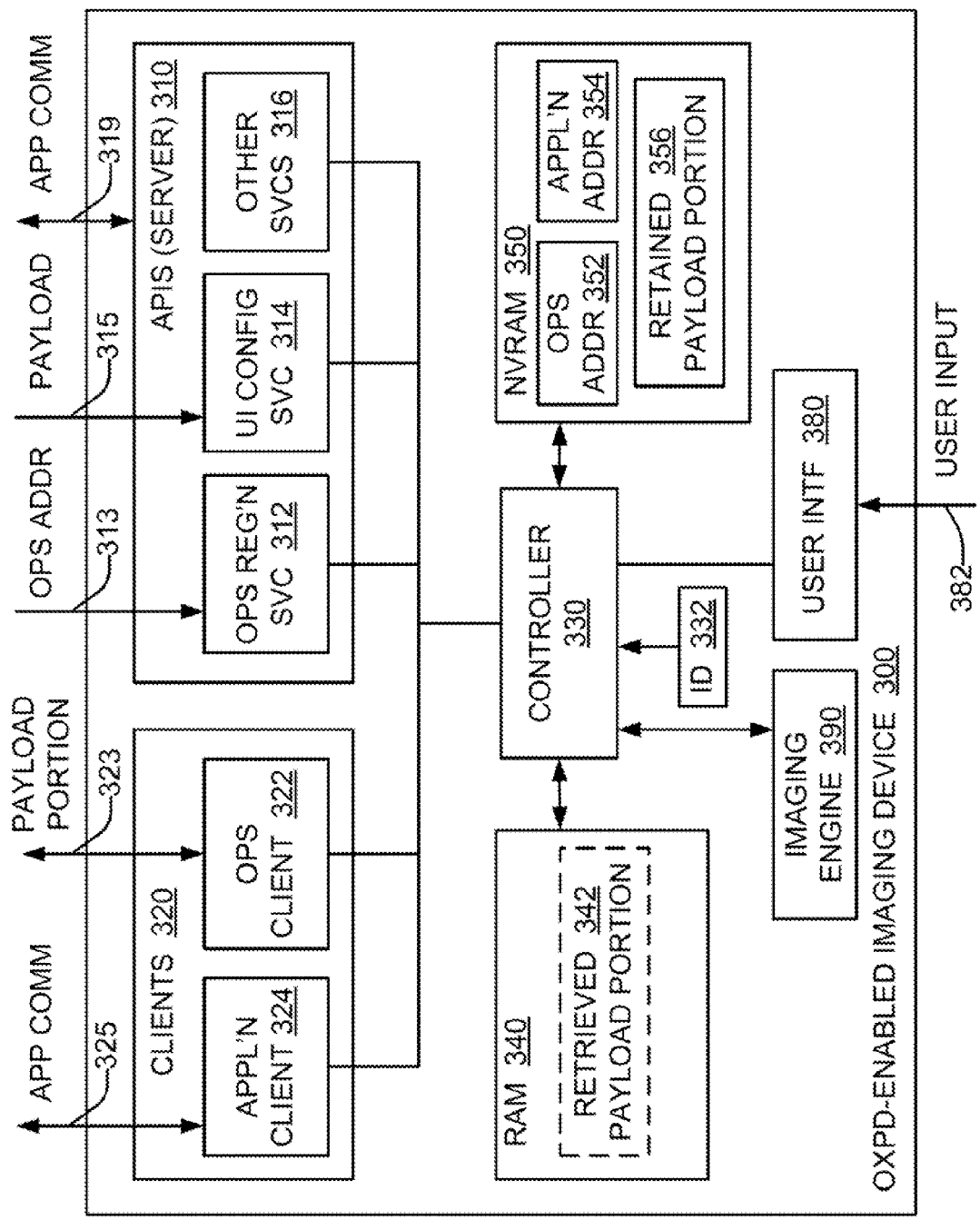

USE OF RESOURCE SERVER FOR IMAGING DEVICE APPLICATION PAYLOAD

BACKGROUND

Imaging devices, such as for example printers, scanners, fax machines, copiers, and multifunction devices that include two or more of these capabilities, are widely used and are often network-capable. While these devices as manufactured typically include a robust set of features and functions, in many situations it is desirable to enhance the devices with other applications or solutions. However, it can be difficult to provide such applications or solutions across a variety of different model imaging devices which target different markets.

BRIEF DESCRIPTION OF THE DRAWINGS

FIGS. 3A-3B are schematic representations of an OXPd-enabled imaging device in accordance with an example of the present disclosure.

DETAILED DESCRIPTION

Figure 1:
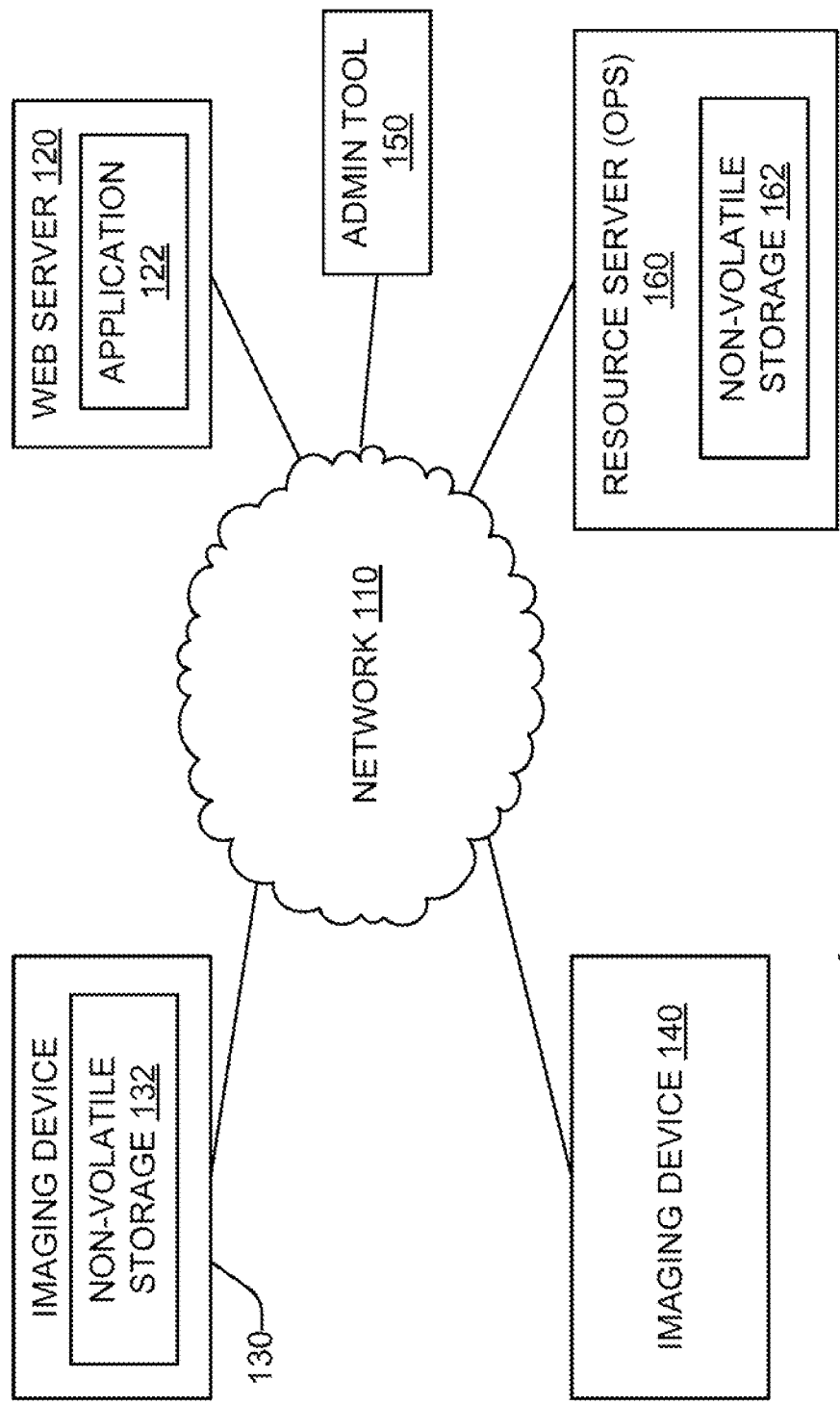
FIG. 1 is a schematic representation of a networked system that includes a plurality of imaging devices each capable of executing a same application resident on a web server external to the devices in accordance with an example of the present disclosure.

As noted in the Background section, in many situations it is desirable to enhance imaging devices with other applications or solutions, but it can be difficult to do so across a variety of different model imaging devices which target different markets. One approach to providing applications and solutions for improving document workflows for networked imaging devices uses web applications. Web applications reside on a network server, and enable device users to access them from the device's user interface, such as its control panel. Server-based web applications advantageously eliminate device-based components of the application, such as for example a USB drive for the application that is plugged into the device in order to run the application. As a result, for example, updating a particular web application is as simple as installing the new version of the application on the server. No changes are made to the imaging devices which can use the application.

Furthermore, some technologies allow a single version of the web application to be usable with a variety of different models of imaging devices. This advantageously eliminates the need for an application provider to supply multiple versions of the application each tailored to the features and capabilities of different imaging device types. It also allows a user who is familiar with the operation of the application on one type of imaging device to easily use it on an imaging device of a different type, such as a new model device that may be purchased in the future. It also simplifies the IT management of imaging devices and web applications across an entire enterprise.

One technology usable for such web applications is the Open Extensibility Platform (OXP) developed by Hewlett-Packard. One aspect of OXP is the Open Extensibility Platform for Devices, OXPd. OXPd is the device layer which is implemented on the imaging devices. OXPd provides a consistent set of application programming interfaces (APIs) for device services in the device that are exposed to, and can be accessed by, the application or solution. A software development kit (SDK) facilitates access to the APIs by the developers of the application.

Imaging device models are typically provided at different price/performance points. Higher-end devices may, for example, implement different (e.g. more complex) communication protocols than lower-end devices. Higher-end devices may also have more on-board permanent (non-volatile) storage for data (including downloaded program code) than do lower-end devices. If an imaging device lacks sufficient non-volatile storage, it may be unable to store certain portions of the web application, such as configuration data, and run-time data, such as for example job statistics, about jobs performed by the device, such as for example copy, scan, print, or fax jobs. In such cases, the web applications may be unable to work with the imaging device. The larger amount of on-board permanent storage in higher-end imaging devices can be used to store the configuration and run-time data of one or more applications, but lower-end imaging devices typically may not. Adding additional non-volatile storage to a lower-end device and the hardware interface to connect that storage, however, is typically infeasible due to increased cost.

A simpler communications protocol that places fewer processing demands on the imaging device than more complex communications mechanisms such as SOAP or RPC may advantageously be used for lower-end imaging devices. One such protocol is REST ("representational state transfer"), which provides a lightweight mechanism for web services. REST utilizes a stateless, client-server, cacheable communications protocol that is based on hypertext transfer protocol ("HTTP"); no session is used. In other words, transactions in REST (such as HTTP GET, POST, PUT, etc., transactions) are self-contained; each REST request made to a server includes in the request all the state information that is needed to perform it. This state information is included, as will be discussed subsequently in greater detail, in the HTTP uniform resource identifier associated with each REST transaction.

In some examples, REST interfaces implement CRUD ("create, request, update, and delete") operations to access data. In some examples, REST uses extensible markup language ("XML") to return data payloads (e.g. from an HTTP GET transaction) and for communications with external clients. REST status messages use standard HTML error codes and messages. OXPd supports REST with these features and capabilities for network communications between the imaging device and the web server.

As defined herein and in the appended claims, an "imaging device" shall be broadly understood to mean a device which produces and/or consumes hard-copy information such as printed documents, graphics, photographs, or the like. Imaging devices include printers, scanners, copiers, fax machines, multi-function devices that combine two or more of these devices, and the like.

As defined herein and in the appended claims, an "OXPd application" shall be broadly understood to mean a web-based application or solution which is based on the HP Open Extensibility Platform for Devices.

As defined herein and in the appended claims, an "OXPd-enabled device" shall be broadly understood to mean a device which implements the OXPd device layer, and which supports and works with OXPd applications.

As defined herein and in the appended claims, the term "REST-protocol" shall be broadly understood to mean a stateless, client-server, sessionless cacheable communications protocol based on hypertext transfer protocol ("HTTP").

As defined herein and in the appended claims, the term "non-volatile storage" shall be broadly understood to mean any form of data storage device usable to store electronic data, including storage that uses electronic, electromechanical, optical, and electro-optical mechanisms, that persists when power is removed from the storage device.

As defined herein and in the appended claims, a "payload" shall be broadly understood to mean data associated with a network-based or web-based application, such as for example an OXPd application. In some examples, the payload may be generated by and/or provided by the application. In other examples, the payload is associated with the application but may be generated by and/or provided by other than the application.

Referring now to the drawings, there is illustrated an example of a networked system in accordance with the present disclosure that includes a plurality of imaging devices, each capable of executing a same web application resident on a web server external to the devices. Where an imaging device lacks sufficient non-volatile storage to persistently store a data payload, or portion thereof, associated with an application, the imaging device can store the payload or payload portion on a resource server external to the imaging device on the network.

Considering now in further detail one example networked system, and with further reference to FIG. 1, the various components of a system 100 are communicatively coupleable via a network 110. The network 110 may be, for example, the Internet. A web server 120 hosts at least one application 122. An application 122 may be executed from an imaging device 130 that has sufficient non-volatile storage 132 on-board to support the application 122. The same application 122 may be executed from a number of different devices 130 simultaneously. An application 122 may also be executed from an imaging device 140 that has insufficient non-volatile storage on-board to support the application 122. The device 140 is configured by a user or administrator through an admin tool 150 to use non-volatile storage 162 in a resource server (also known as an "OXPd Pro Services Server", or "OPS") 160 to store in a persistent manner some or all of a payload received by the device 140 from the web server 120 on the OPS 160. The device 140 retrieves from the OPS 160 the payload (or portion thereof) stored in the storage 162 when needed. Any individual imaging device 140 utilizes a single OPS 160. However, a number of different devices 140 can utilize the storage 162 of the same OPS 160. The system 100 may include plural OPS's 160. Such plural OPS's 160 may be used, for example, for load balancing purposes.

The same application 122 may be executed from a number of different devices 140 simultaneously, and/or from a mix of OXPd-enabled devices 130, 140 simultaneously. The application 122 has no knowledge as to whether any of the OXPd-enabled devices 130, 140 uses an OPS 160 for payload storage. The application 122 typically has no awareness of the OPS 160 at all. This advantageously allows the application 122 to operate without modification on a low-end imaging device that does include sufficient on-board non-volatile storage for the payload. The OXPd-enabled imaging device 130, 140 itself knows whether or not it uses the OPS 160 for payload storage, but the application 122 does not know.

In some examples, the OPS 160 and the web server 120 may be co-located. In some examples, the OPS 160 and the web server 120 may be the same physical server. In some examples, the admin tool 150 may be part of, or supplied with, the application 122. In some examples, the admin tool 150 may use HP Web Jetadmin ("WJA"), web-based imaging device management software used to install, configure, troubleshoot, and manage networked devices.

Figure 2:
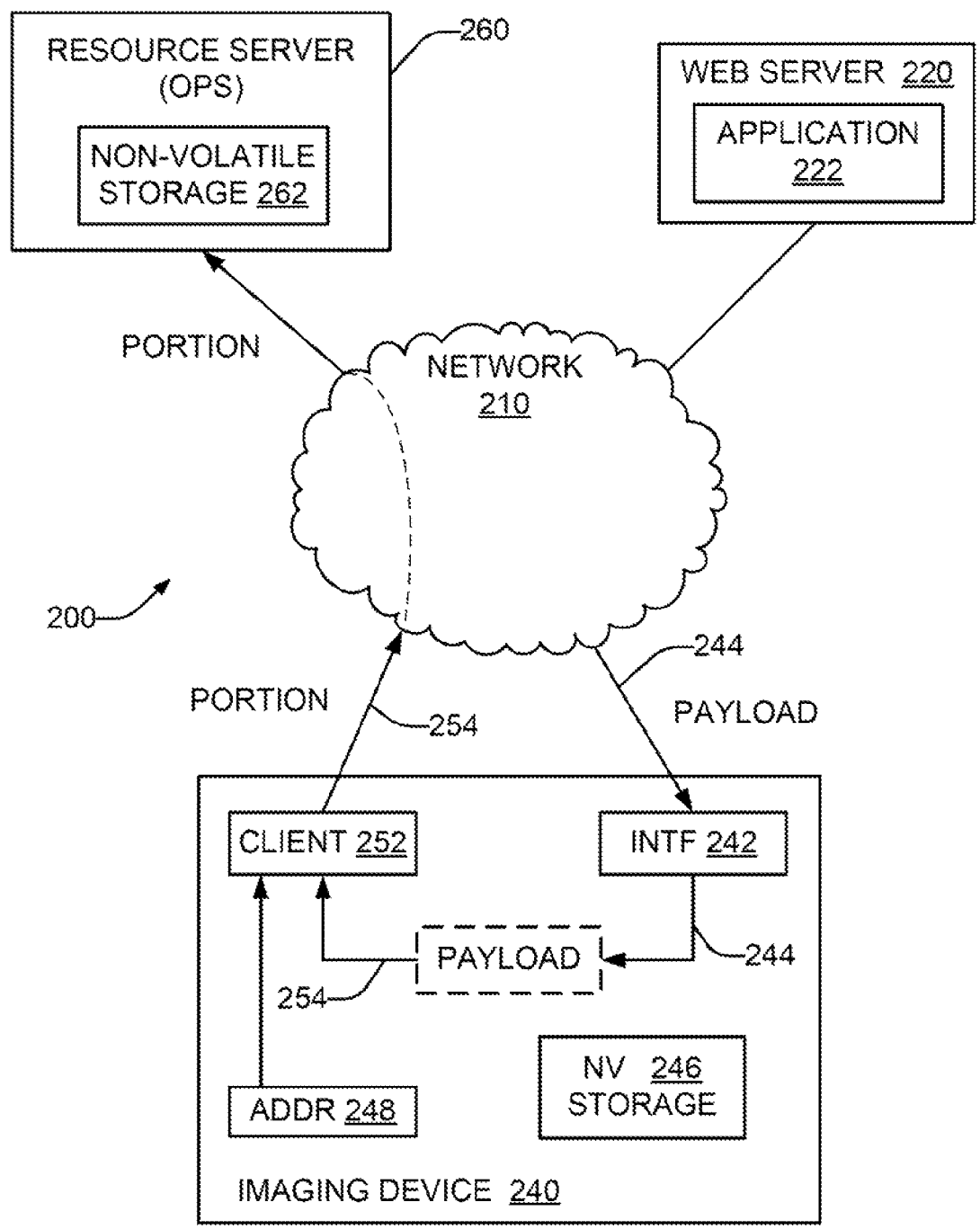
FIG. 2 is a schematic representation of another networked system that includes an imaging device in accordance with an example of the present disclosure.

Considering now another example networked system that includes an imaging device, and with reference to FIG. 2, a system 200 includes a network 210, a web-server 220 that hosts at least one application 222, a resource server 260, and an imaging device 240.

The imaging device 240 includes an interface 242 structured to receive over the network 210 a payload 244 for the application 222. In some examples, the payload 244 may be a registration payload to register the application 222 on the imaging device 240 such that, when a user of the imaging device 240 desires to access those applications associated with the imaging device 240, the application 222 will be included among those applications. The device 240 also includes a non-volatile (persistent) storage 246 insufficient to store the payload 244. The device 240 further includes an address 248 on the network 210 of the resource server 260. The device 240 additionally includes a client 252 structured to use the URI 248 of the resource server 260 to store at least a portion 254 of the payload on the resource server 260 to access the server 260. In some examples, the payload portion 254 is the entire payload 244. In other examples, the payload portion 254 may be less than the entire payload 244, or a subset of the payload 244. In some examples, the portion 254 is stored in non-volatile storage 262 of the server 260. In some examples, where the payload portion 254 is less than the entire payload 244, a different portion of the payload 244 other than the portion 254 may be stored on the non-volatile storage 246 of the device 240 itself. By using the resource server 260 to store the portion 254 of the payload 244, the application 222 can be registered with, and subsequently operated from, the imaging device 240, even though the device's internal non-volatile storage 246 is insufficient for doing so.

The address 248, in some examples, may be a portion of a uniform resource identifier ("URI"). A URI is used to specify a resource on a network by its location. Assume that a resource server is located at an internet protocol ("IP") network address "70.127.66.64" and accessed via port 8080. An example URI for accessing, via a secure HTTP session, a particular resource "res3" of resource type "type2" belonging to imaging device "dvc1" is "https://70.127.66.64:8080/oxpdleodr/dvc1/type2/res3". For this example URI, the portion corresponding to the network address 248 would be "70.127.66.64:8080".

As defined herein and in the appended claims, the term "resource server" shall be broadly understood to mean a data server [according to a REST architecture] in which a URI, or a portion thereof, identifies a corresponding resource accessible on the data server via a stateless interaction. For example, the URI portion "/oxpdleodr/dvc1/type2/res3" identifies the resource "res3" of resource type "type2" belonging to imaging device "dvc1" discussed above.

In one example, the imaging device 240 is an OXPd-enabled imaging device; the application 222 is an OXPd application; the interface 242 is a REST-protocol interface; the resource server 260 is a REST-protocol resource server; and the client 252 stores the payload portion 254 using REST protocol.

In one example, the network 210, the web-server 220, the application 222, the resource server 260, and the imaging device 240 may be the network 110, the web-server 120, the application 122, the resource server 160, and the imaging device 140 of the system 100 of FIG. 1.

Figure 3B:
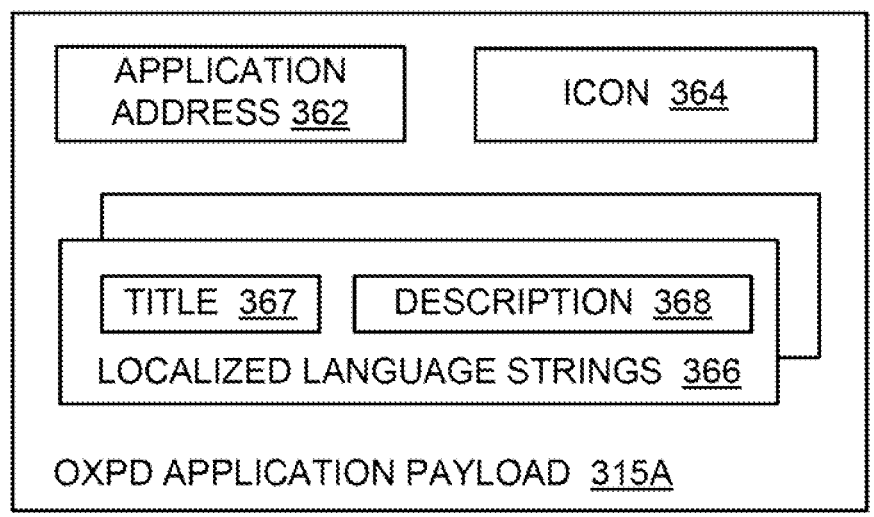

Considering now one example of an imaging device in greater detail, and with reference to FIGS. 3A-3B, an OXPd-enabled imaging device 300 includes application programming interfaces (APIs) 310 for a set of services. The set of APIs 310 may include, or correspond to, the REST-protocol interface 242 (FIG. 2). The APIs 310 are typically referred to as Device Services APIs for RESTful services of the imaging device 300 that are used for monitoring and managing the operations, and controlling the functions, of the imaging device 300 through Internet protocols, as will be discussed subsequently. When an external entity, such as an OXPd application on an external web server, accesses the imaging device 300 via an API, the device 300 functions as a server while the application functions as a client.

In one example, the API set 310 includes APIs for an OPS registration service 312, a user interface (UI) configuration service 314, and one or more other services indicated generally at 316. In some examples, such other services 316 may include services that access, perform, and/or operate an imaging engine 390, such as a scan engine, a print engine, a fax engine, or the like in response to communications received at the appropriate service 316.

The OXPd-enabled imaging device 300 also includes a set of clients 320. The set of clients 320 may include, or correspond to, the client 252 (FIG. 2). In one example the client set 320 includes an OPS client 322 and an application client 324. These will be discussed subsequently in greater detail.

The OXPd-enabled imaging device 300 include a user interface 380. The user interface 380 typically includes one or more user control elements that receive inputs 382 from a user of the imaging device 300, and one or more user display elements that communicate information to the user. One example user interface 380 may be, or include, a touch-sensitive display or touchscreen. Input elements such as labeled buttons or regions may be displayed on certain areas of the display and, when the corresponding area on the display is pressed by the user, interpreted by the imaging device 300 as a user input corresponding to the input element or button. The touchscreen may also display to the user textual, graphical, and/or image information.

A controller 330 of the OXPd-enabled imaging device 300 is communicatively coupled to the set of APIs 310, the set of clients 320, the user interface 380, and the imaging engine 390. In some examples, the controller includes a processor, and the APIs 310 and the clients 320 may be implemented as software or firmware that can be executed by the processor.

The controller 330 is also communicatively coupled to a volatile RAM ("RAM") memory 340 that is not persistent (i.e. does not retain its contents when power is removed from the device 300), and a non-volatile RAM ("NVRAM") memory 350 that is persistent (i.e. it does retain its contents when power is removed from the device 300). The NVRAM 350 in the OXPd-enabled imaging device 300 may include, or correspond to, the non-volatile storage 246 (FIG. 2). As will be discussed in greater detail below, the NVRAM 350 has insufficient available non-volatile storage space to store the entirety of certain payloads received by the imaging device 300 from an external OXPd application (such as configuration payloads), or certain payloads generated by the imaging device 300 (such as job statistics payloads). The OXPd application may correspond to application 222 (FIG. 2). In lower-end imaging devices, for example, the storage capacity of the available NVRAM 350 may be limited for cost reasons, and such devices also lack other forms of persistent read-write memory such as a hard disk drive that could otherwise be used for storing such payloads.

In some examples, the OXPd-enabled imaging device 300 includes a device identifier ("device ID") 332. The device ID 332 may be, for example, a unique number such as a serial number of the device 300, or a universally unique identifier ("UUID") constructed according to an identifier standard from, for example, the Open Software Foundation as part of the Distributed Computing Environment. While for simplicity the device ID 332 is illustrated as a separate element, in some examples it may be a value maintained at a storage location in the NVRAM 350. The device ID 332 allows the OXPd-enabled imaging device 300 to be uniquely identified when it communicates with other devices on the network.

Considering now the APIs 310 and their operation in greater detail, the OPS registration service 312 is configured to receive an address 313 of an OPS, such as for example OPS 160 (FIG. 1), 260 (FIG. 2). The OPS address 313 represents the particular OPS which the imaging device 300 may use to store the payload, or portion thereof, received by the imaging device 300 from an external OXPd application. The controller 330 stores the received OPS address 313 in the NVRAM 350 as OPS address 352.

The UI configuration service 314 is configured to receive a payload 315 for an OXPd application stored on an external web server, such as for example web server 120 (FIG. 1), 220 (FIG. 2). In one example, the payload 315 is a registration payload 315A of an OXPd application such that, when a user of the OXPd-enabled imaging device 300 desires to access those external web applications that are associated with the OXPd-enabled imaging device 300, the OXPd application corresponding to the registration payload will be included among those applications.

The registration payload 315A includes an address 362 on the network of the corresponding OXPd application. As has been described heretofore, the application network address is typically the IP address portion of a URI, such as for example "70.127.60.68". The controller 330 extracts the received application address 362 from the registration payload 315 and stores it in the NVRAM 350 as application address 354. The registration payload 315A also includes an icon 364 that is associated with the corresponding OXPd application. This icon 364 is displayable on the user interface 380 as, for example, a labeled button or region with which the user can interact in order to provide an input to the user interface 380 corresponding to the selection of the icon 364. The registration payload 315A may further include one or more localized language strings 366. Each localized language string 366 typically is text in a particular language. For example, a first language string 366 may be English, a second language string 366 may be Spanish, and so on. A language string 366 may include at least a language-localized title 367 of the OXPd application, and a language-localized description 368 of the OXPd application.

The controller 330 is further structured to determine the portion of the payload 315 that is to be stored on the external resource server. In some examples, the portion is the entire payload 315. In other examples, the controller 330 may assess the size of the payload 315 and the amount of available memory space in the NVRAM 350 or other non-volatile storage of the imaging device 300. Where less memory space is available, the payload portion may be larger; conversely, where more memory space in available, the payload portion may be smaller. If the payload portion is less than the entire payload 315, then in some examples the controller 330 is further structured to store a different portion of the payload in the NVRAM 350 or other on-board non-volatile storage as a retained payload portion 356.

The other services 316 are configured to interact with an external OXPd application via commands 317. These other services 316 may include some or all of an accessories service, an authentication service, an authorization service, and a statistics service, in addition to other services. The accessories service provides remote access to universal serial bus ("USB") accessories (not shown) plugged into one or more ports (not shown) of the imaging device 300. The authentication service provides methods for managing the OXPd authentication agents of the imaging device 300, initiating the login process, and ending a user session. The authorization service provides methods for managing an OXPd authorization proxy of the imaging device 300, which manages which applications an authenticated user is allowed to access. The statistics service provides methods for managing the device's OXPd statistics agents, which enable per-job statistics data to be collected.

Considering now the clients 320 and their operation in greater detail, the OPS client 322 is structured to communicate via HTTP with the external OPS to store payload portions 323 on, and retrieve payload portions 323 from, the external OPS. The application client 324 is structured to communicate via HTTP with the external OXPd application using application commands 325. In another example, a single client may be structured to communicate with both the external application and the external OPS. In some examples, either or both of the clients 322, 324 may be an HTML web browser. In some examples, the HTML web browser may be a full-featured browser, while in other examples it may support a subset of browser features and omit others. In some examples, one or both of the clients 322, 324 may use XML, instead of HTML, for communication with external clients via REST protocol. For examples, XML may be used (instead of HTML, CSS, or JavaScript) for describing and accessing the user interface elements of the OXPd application that may be presented on the user interface 380 of the imaging device 300 when the OXPd application is being executed by the imaging device 300.

The OXPd application is operable on the external web server from the user interface 380 of the imaging device 300. When the user wishes to initiate execution of the OXPd application from the imaging device 300, in one example the user provides an input at the user interface 380 to select an "Applications" icon, button, or control. In response, a built-in function of the imaging device 300 displays on the user interface 380 the icons of all OXPd applications that have been registered with the imaging device 300. To do this, the imaging device 300 uses the registration payload 315A of each registered OXPd application. However, since at most a portion of the registration payload 315A has been retained as retained payload portion 356 in the RAM 340, the imaging device 300 typically does not have on-board all the payload information to be used. As a result, the payload portion 323 stored on the external resource server (OPS) is first retrieved using the OPS 322. The controller 330 stores the retrieved payload portion 323 in the volatile RAM 340 as retrieved payload portion 342. Once the imaging device 300 has the entire registration payload 315A, an icon for the corresponding OXPd application is presented on the user interface 380. In some examples, the payload portion 323 is retrieved during the power-on boot process of the imaging device so that a more rapid response can be provided to the selection of the "Applications" icon, button, or control.

The user can then provide a user input 382 that selects the corresponding icon 364 and initiates execution of the OXPd application. The imaging device 300 then interacts with the OXPd application to execute the application. To execute the OXPd application from the imaging device 300, the application client 324 accesses the OXPd application via application commands 325. In some examples, the application commands 325 are URIs constructed using the application address 354. The user interface elements of the OXPd application are obtained from the OXPd application and displayed on the user interface 380. The imaging device 300 receives inputs from the user via the user interface 380 to interact with these OXPd application elements. In response, application commands 325 corresponding to the user interactions are communicated by the application client 324 to the external OXPd application. The OXPd application, in turn, may communicate application commands 319 to ones of the various device service APIs 310. The OXPd application is executed from the imaging device 300 in this manner.

Considering the structure of the various transactions 313, 315, 319, 323, 325 between the imaging device 300 and either the OPS or the OXPd application, commands are sent from a client to a service (or server), and responses are sent from the service (or server) to the client. These transactions are HTTP transactions for CRUD operations performed using REST-protocol. For the application commands 325, and for storing and retrieving the payload portion 323, the clients 320 issue HTTP GET, POST, PUT, or DELETE commands to the service/server. These commands include a URI which identifies a particular predefined resource of the resource server (OPS).

In the case of an HTTP GET command (such as, for example, to retrieve the payload portion 323 from the OPS), the response is returned in the form of an extensible markup language ("XML") message. In the case of an HTTP PUT or POST command (such as, for example, to store the payload portion 323 on the OPS), an XML message may be appended to the command. The controller 330 may process received XML messages, and construct XML messages included with commands.

Note that, while the use of the resource server (OPS (for storage by the imaging device 300 has been described with reference to at least a portion of the registration payload 315A, the OPS may also be used by the imaging device 300 for storing other OXPd application-related information. Examples of such information may include Home Screen messages for the imaging device, authorization and authentication details (e.g. certificates) of the OXPd application, and details of printer accessories used by the OXPd application, among other information.

Figure 4:
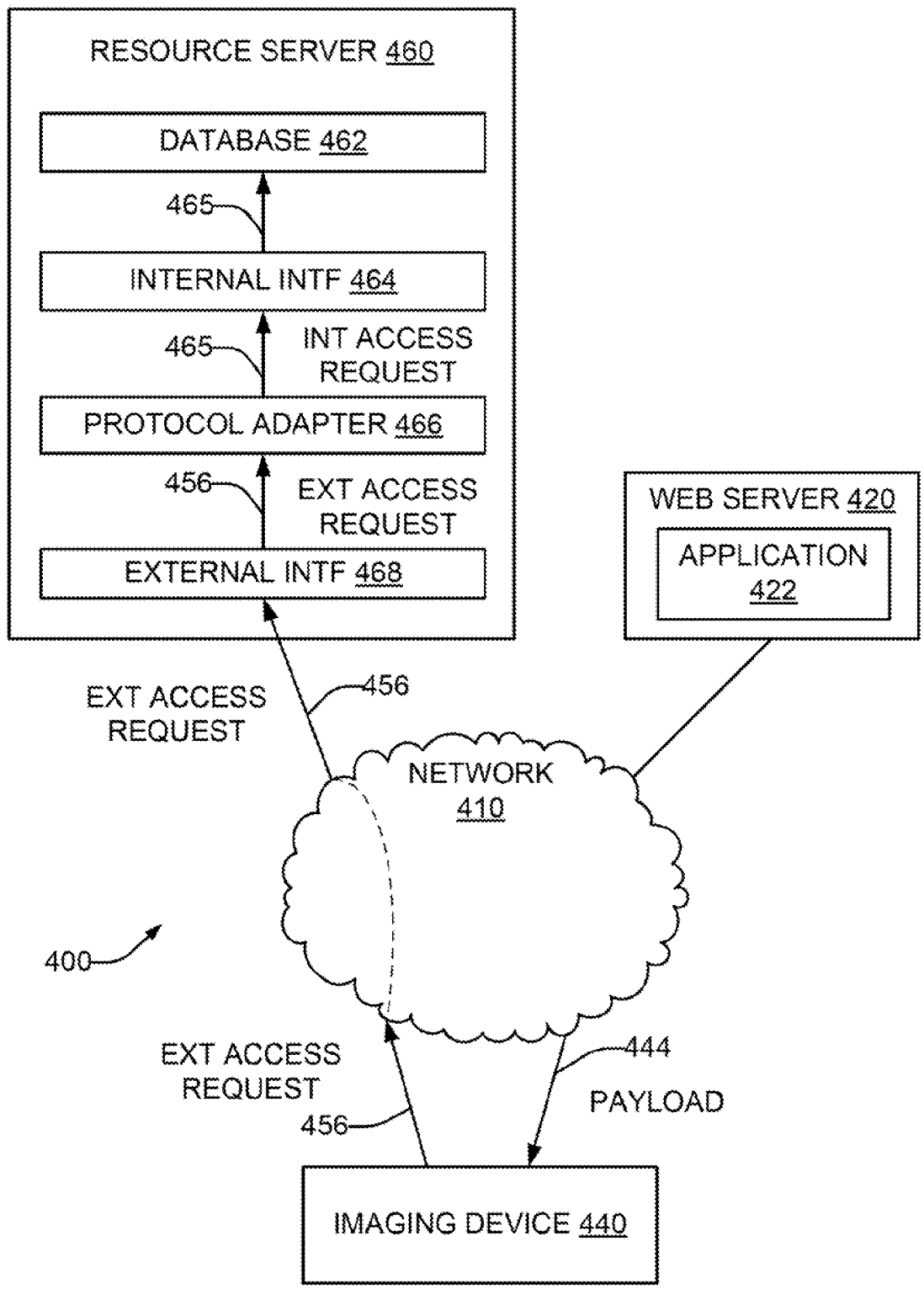
FIG. 4 is a schematic representation of another networked system that includes a resource server in accordance with an example of the present disclosure.

Considering now another example networked system that includes an imaging device, and with reference to FIG. 4, a system 400 includes a network 410, a web-server 420 that hosts at least one application 422, an imaging device 440, and a resource server (OPS) 460.

The OPS 460 includes a database 462 suitable to store unstructured data. The OPS 460 also includes an internal interface 464 structured to access the database 462 via internal access requests 465. The OPS 460 further includes an external interface 468 structured to receive an external request 456 to access a particular resource of the database 462 from the networked imaging device 440. The request 456 corresponds to at least a portion of a payload 444 for the application 422 on the web server 420. The payload 444 is sent to the imaging device 440 from another source. In some examples, the source is the web server 420, while in other examples the source is a network element (not shown) other than the web server 420 and the OPS 460. The OPS 460 also includes a protocol adapter 466 structured to convert the external access request 456 to the corresponding internal access request 465 which is usable by the internal interface 464 to access the database 462.

In one example, the resource server 460 is a REST-protocol resource server, the external access request 456 is a REST-protocol access request; the internal access request 465 is a non-REST-protocol access request; the imaging device 440 is an OXPd-enabled imaging device; and the application 422 is an OXPd application.

In one example, the network 410, the web-server 420, the application 422, the resource server 460, and the imaging device 440 may be the network 110, the web-server 120, the application 122, the resource server 160, and the imaging device 140 of the system 100 FIG. 1.

Figure 5:
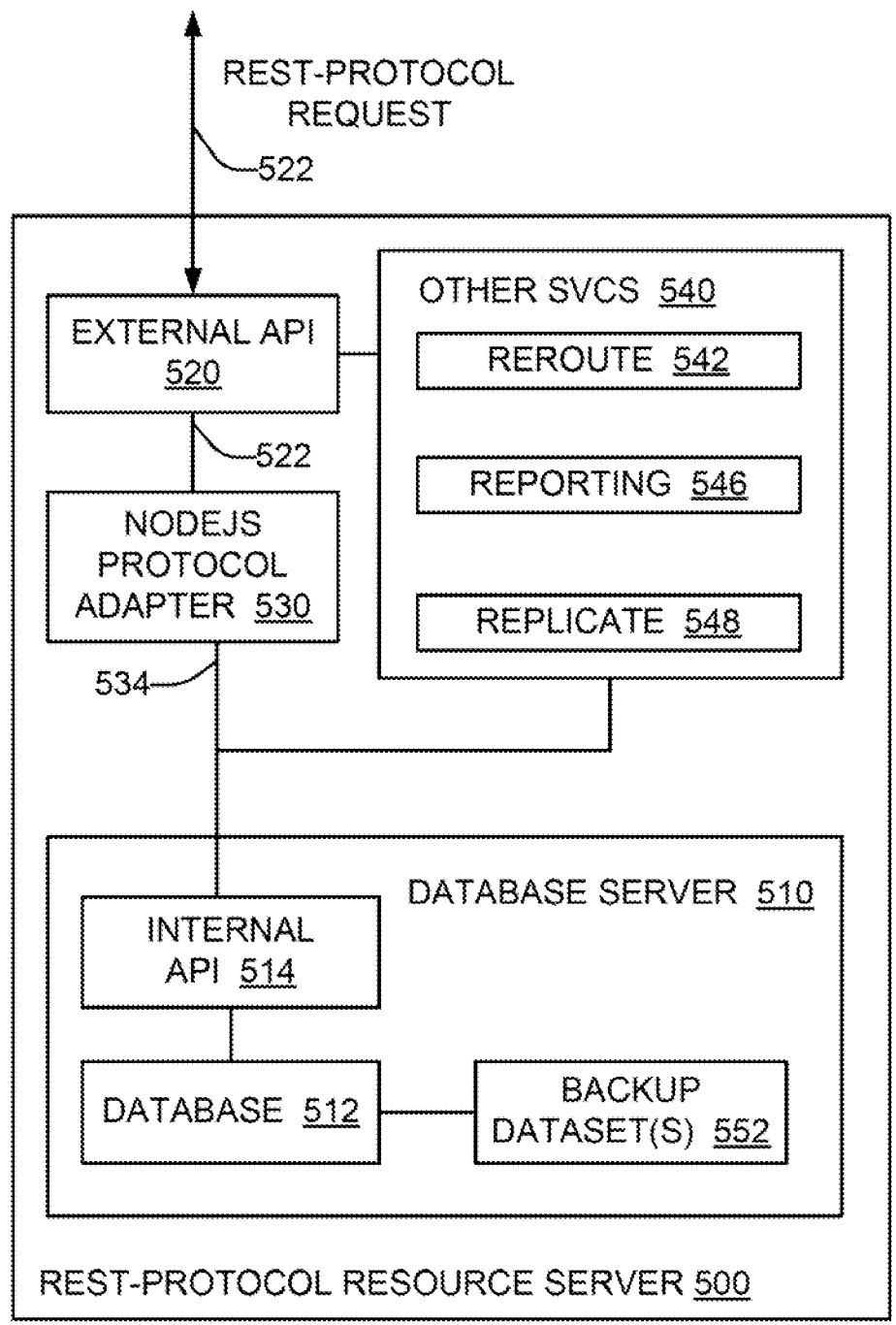
FIG. 5 is a schematic representation of a REST-protocol resource server in accordance with an example of the present disclosure.
Figure 6:
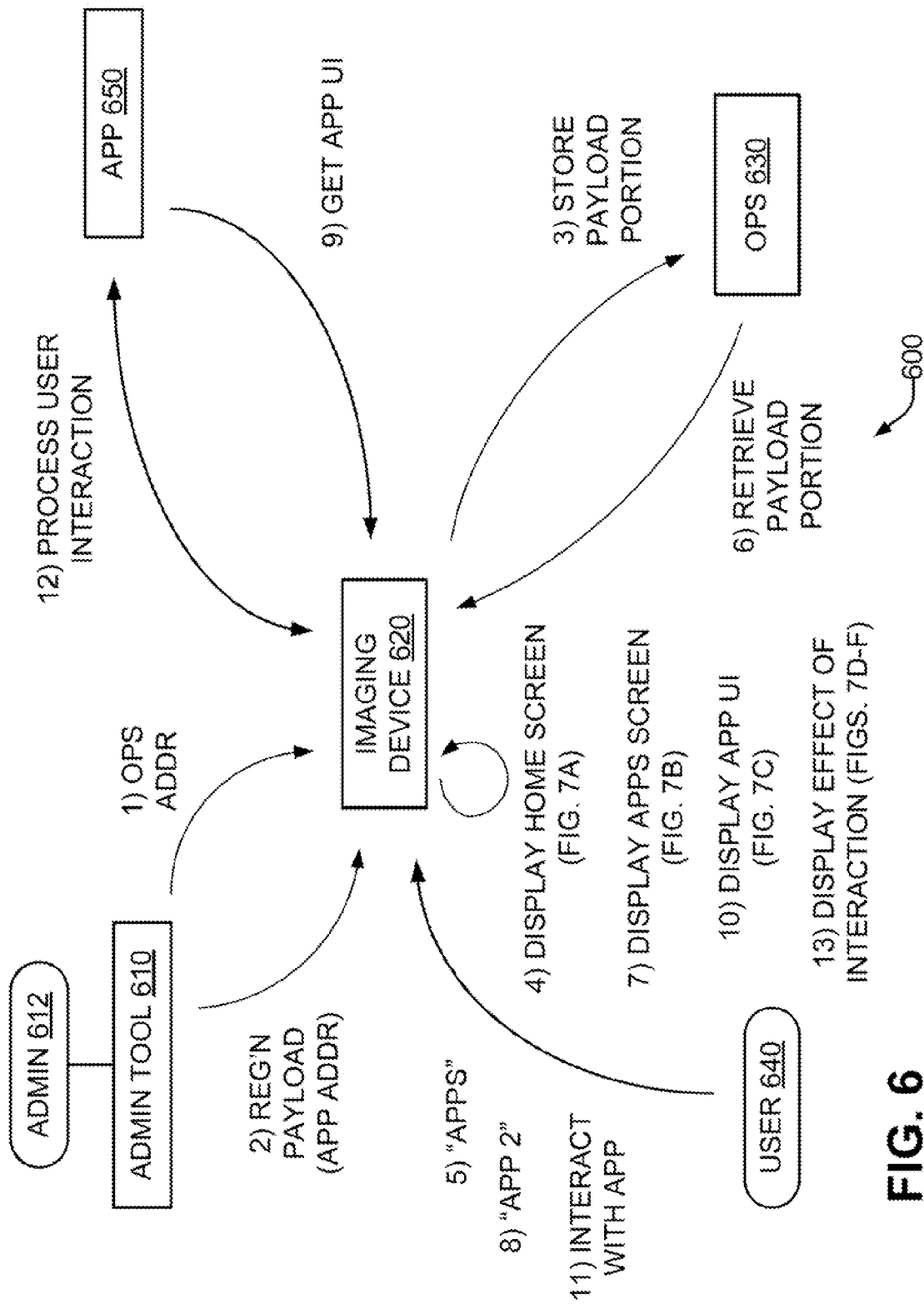
FIG. 6 is a schematic representation of the configuration and operation of the imaging device of FIG. 1, 2, or 3A-3B to execute a web application and the associated use of the resource server of FIG. 1, 4, or 5, in accordance with an example of the present disclosure.

Considering now one example of a resource server (OPS) in greater detail, and with reference to FIG. 5, a REST-protocol OPS 500 includes a database server 510. In some examples, the database server 510 is a lightweight NoSQL ("Not Only SQL") database server. NoSQL, which encompasses a wide range of technologies and architectures, solves scalability and big data performance issues that relational databases are not designed to address. A NoSQL database server is advantageous when massive amounts of unstructured data, or data that is stored remotely on multiple virtual servers on the network, is to be accessed and/or analyzed. The database server 510 includes a database 512, and an internal API 514 for accessing the database 512.

The OPS 500 can be used by an OXPd-enabled imaging device to store both unstructured textual data, and unstructured non-textual data. Textual XML messages stored on the OPS 500 are considered to be unstructured data because they are stored by the OPS 500 as raw data without parsing. Non-textual unstructured data includes the image files (e.g. in .png format) for the icons 364 (FIG. 3). These image files may be embedded in XML messages to form non-textual XML messages.

The OPS 500 also includes an external API 520 that receives external REST-protocol requests 522 to access the database 512. The REST-protocol requests 522 may be received from one or more different OXPd-enabled imaging devices. Where multiple imaging devices access the same OPS 500, separate datasets are maintained for each imaging device. The particular imaging device accessing the OPS is identified by the URI. For example, in the URI of the access request "https://70.127.66.64:8080/oxpdleodr/dvc1/type2/res3" the "dvc1" field denotes the particular imaging device making the access request. It is noted that the OPS 500 is not limited to storing and retrieving data from imaging devices; any network device that stores and retrieves unstructured data according to REST protocol may use the OPS 500 for that data.

The OPS 500 further includes a protocol adapter 530 that translates REST-protocol access requests 522 received at the external API 520 to non-REST-protocol access requests 534 issued to the internal API 514. In some examples, the protocol adapter 530 operates in an event-driven and non-blocking manner. When a first REST-protocol access request 522 is received at the protocol adapter 530, the adapter 530 accepts the request 522, issues the corresponding non-REST-protocol access request 534 to the internal API 514, and then is available to service a second REST-protocol access request 522 should one be received while the database server 510 is processing the non-REST-protocol access request 534. When the first non-REST-protocol access request 534 is completed by the database server 510, the results are returned to the protocol adapter 530, which in turn returns the results through the external API 520 to the requestor to complete the first REST-protocol access request 522. Thus from the requestor's point of view (e.g. that of the imaging device), the REST transaction 522 is both stateless and sessionless although the operation of the protocol adapter 530 itself is event-driven and non-blocking.

In some examples the OPS 500 includes a set of additional services 540. A rerouting service 542 interfaces to the external API 520. The rerouting service 542 is structured to determine whether the OPS 500 is unavailable to process the REST-protocol request 522 received at the external API 520 and, if the OPS 500 is unavailable, the rerouting service 542 automatically re-routes the received request 522 through the external API 520 to a different networked REST-protocol resource server (not shown) on the network. As defined herein and in the appended claims, the terms "automated" or "automatically" (and like variations thereof) shall be broadly understood to mean controlled operation of an apparatus, system, and/or process using computers and/or mechanical/electrical devices without the necessity of human intervention, observation, effort and/or decision.

A reporting function 546 is structured to process a REST-protocol request 522 in the form of a message received at the external API 520 from the imaging device, the message having statistics related to an imaging job completed by the imaging device. The reporting function 546 then sends a REST-protocol message 522 derived from the statistics through the external API 520 to at least one agent on the network which has subscribed to receive the statistics. The agent may be, for example, associated with an administrator or a user of the imaging device.

A replicate function 548 is structured to replicate the database 512 to form a backup dataset 552. The replicate function 548 may be configured to execute periodically or upon request. It may execute in response to an external REST-protocol request 522, or automatically based on a command generated internally by the OPS 500. In some examples, a plurality of backup datasets 552 made at different times may be maintained. In case of data loss or corruption of the database 512, an appropriate backup dataset 552 may be restored to re-form the database 512, thus avoiding or minimizing the effect of the lost or corrupted data.

Considering now the configuration and operation of an imaging device to execute a web application, and the associated use of a resource server, and with reference to FIGS. 6 and 7A-7F, one example sequence of operations 600 between and among these and other elements is illustrated. At step 1), a network address of the resource server (OPS) 630 is sent from an admin tool 610 to the imaging device 620. The admin tool may be operated by an administrator 612, such as the administrator of a fleet of an enterprise's imaging devices. The OPS address is then stored in non-volatile storage of the imaging device. At step 2), a registration payload is received. In some examples, the registration payload is also sent by the administrator 612 through the admin tool 610, although it could be obtained in other ways, such as for example from a web server that hosts or is associated with the web application 620. The registration payload includes a network address of the web application 620, and the imaging device 620 extracts the application network address and stores it in non-volatile storage of the imaging device. Since the imaging device has insufficient non-volatile storage to store the entire registration payload in a persistent manner, at step 3) the imaging device 620 sends at least a portion of the registration payload—which in some examples, as has been described heretofore, may be the entire registration payload—to the OPS 630 located at the OPS address for storage.

Following the completion of step 3), the imaging device 620 has been configured to execute the web application. At step 4), a user 640 provides an input at a user interface of the imaging device 620 to display a Home screen, such as example Home screen 710 (FIG. 7A), on the display portion of the user interface of the imaging device 620. At step 5), the user 640 selects an "Apps" icon 712 on the home screen 710. The imaging device 620 interprets the selection as a request to display the web applications that have been registered (i.e. configured for operation) with the imaging device 620. At step 6), in response, the imaging device 620 retrieves the portion of the registration payload(s) stored on the OPS for the web application(s) registered with the imaging device 620. While step 6) has been described in this example as responsive to step 5), in other examples step 6) may be performed at an earlier time following step 3), such as for example during boot-up of the imaging device 620. The imaging device 620, at step 7), uses the icon 364 and appropriate localized language strings 366 (FIG. 3B) for the desired language to display an Applications screen, such as example Applications screen 720 (FIG. 7B), on the display portion of the user interface of the imaging device 620. At step 8), the user 640 selects a particular web application—for example, "App 2" 722—on the Application screen 720.

The imaging device 620 interprets the selection as a request to execute the web application 650 that corresponds to "App 2". At step 9), in response, the imaging device 620 issues a request to the "App 2" web application 650 located at the application network address in order get the initial user interface of the application 650. After the user interface is received at the imaging device 620, it is displayed on the display portion of the user interface of the imaging device 620 at step 10). For example, the initial user interface for the "App 2" application 650 is presented as Authentication screen 730 (FIG. 7C) and entry by the user 640 of a PIN or password is awaited.

Steps 11), 12), and 13) represent interactions of the user 640 with the "App 2" application 650 and the results of those interactions. Interactions made by the user 640 at step 11) are communicated to the "App 2" application 650 at step 12) to be processed. This processing typically includes changes to the user interface which are communicated to the imaging device 620 by the "App 2" application 650. The processing may also include the "App 2" application 650 issuing other communications to the imaging device 620, such as calls to various APIs 310 (FIG. 3A). At step 13), the effect or results of the user interactions is displayed on the display portion of the user interface of the imaging device 620. As part of steps 12-13, further payloads or data may be stored on and/or retrieved from the OPS 630 by the imaging device 620.

Figure 7A:
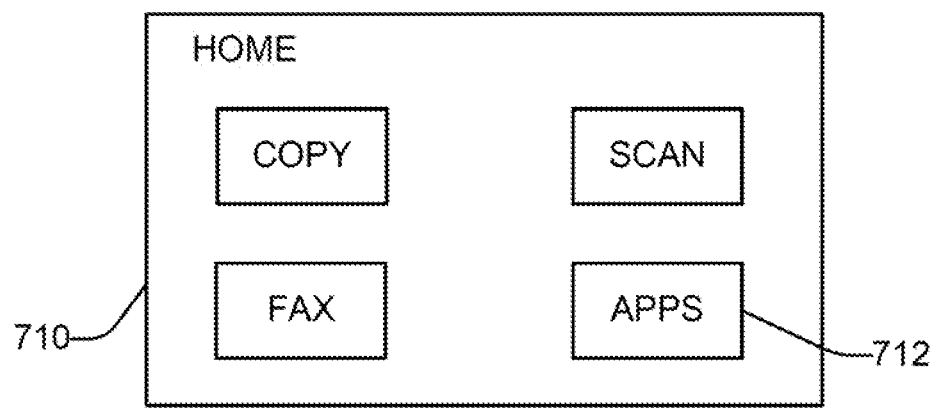
FIGS. 7A through 7F are schematic representations of a sequence of user interface display screens corresponding the system operation of FIG. 6 in accordance with an example of the present disclosure.
Figure 7B:
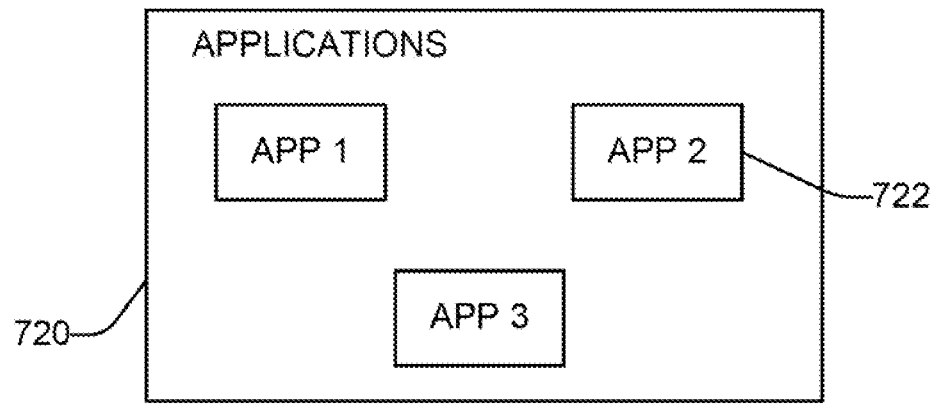
Figure 7C:
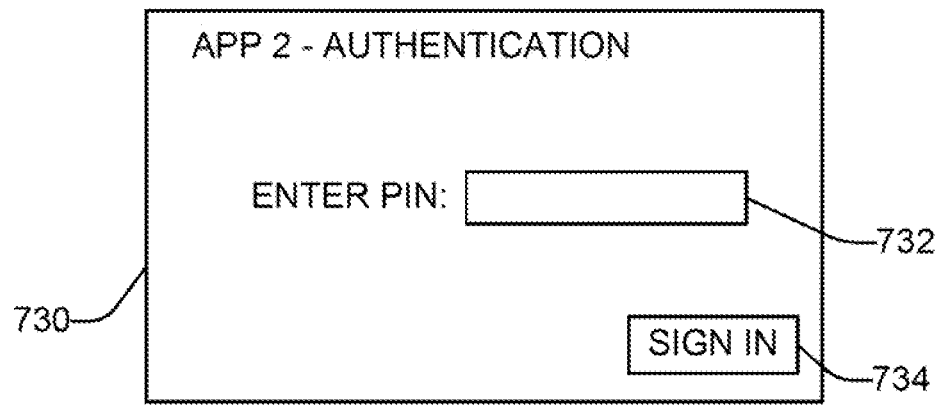
Figure 7D:
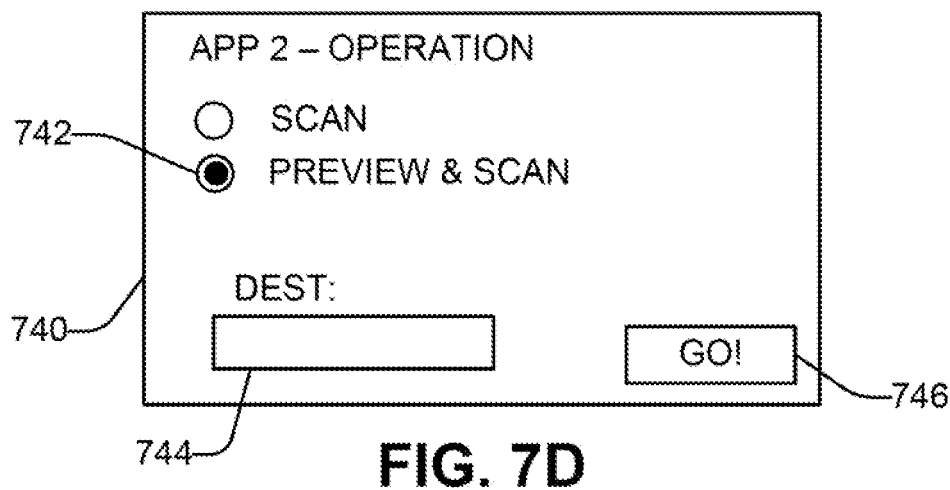
Figure 7E:
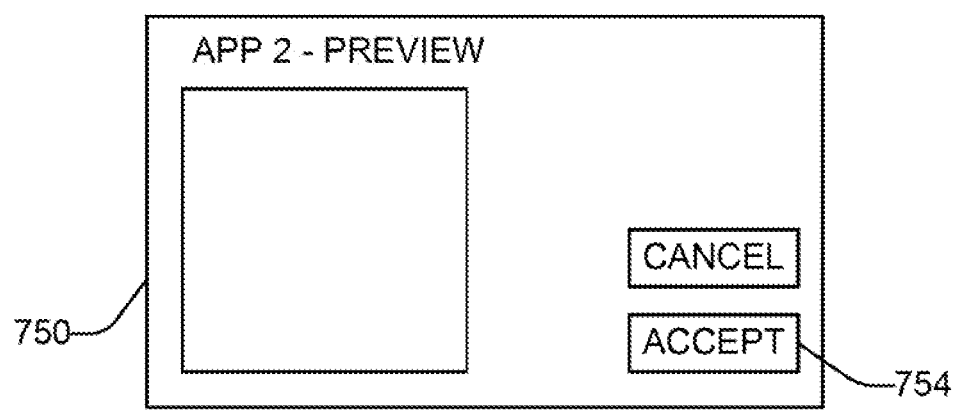
Figure 7F:
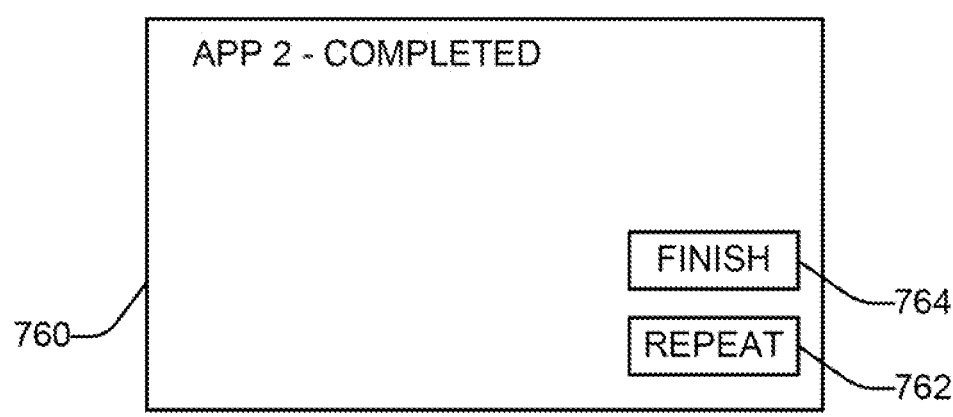

FIGS. 7D-F illustrate a simple example sequence of user interactions and their resulting effect on the imaging device 620 according to steps 11) through 13). After the user 640 enters the PIN 732 and selects the "Sign In" icon 734 (FIG. 7C), the imaging device 620 next displays the example Operation screen 740. Assume that the user 640 selects the Preview & Scan icon 742, enters a Destination 744 such as a filename, and selects the Go! icon 746. In response to the selection of the Go! icon 746, the "App 2" application 650 instructs the imaging device 620 to perform a preview scan. After the next user interface is sent to the imaging device 620, the example Preview screen 750 is displayed showing the results 752 of the preview scan. Assume that the user 640 is satisfied with the preview scan and thus selects the Accept icon 754 next. In response, the "App 2" application 650 instructs the imaging device 620 to perform a final scan. After the final scan is performed, the example Completed screen 760 is displayed. If the user selects the Repeat icon 762, the example Operation screen 740 may again be displayed. If the user selects the Finish icon 764, the operation of the "App 2" application 650 concludes and, for example, the Home screen 710 (FIG. 7A) is displayed.

Figure 8:
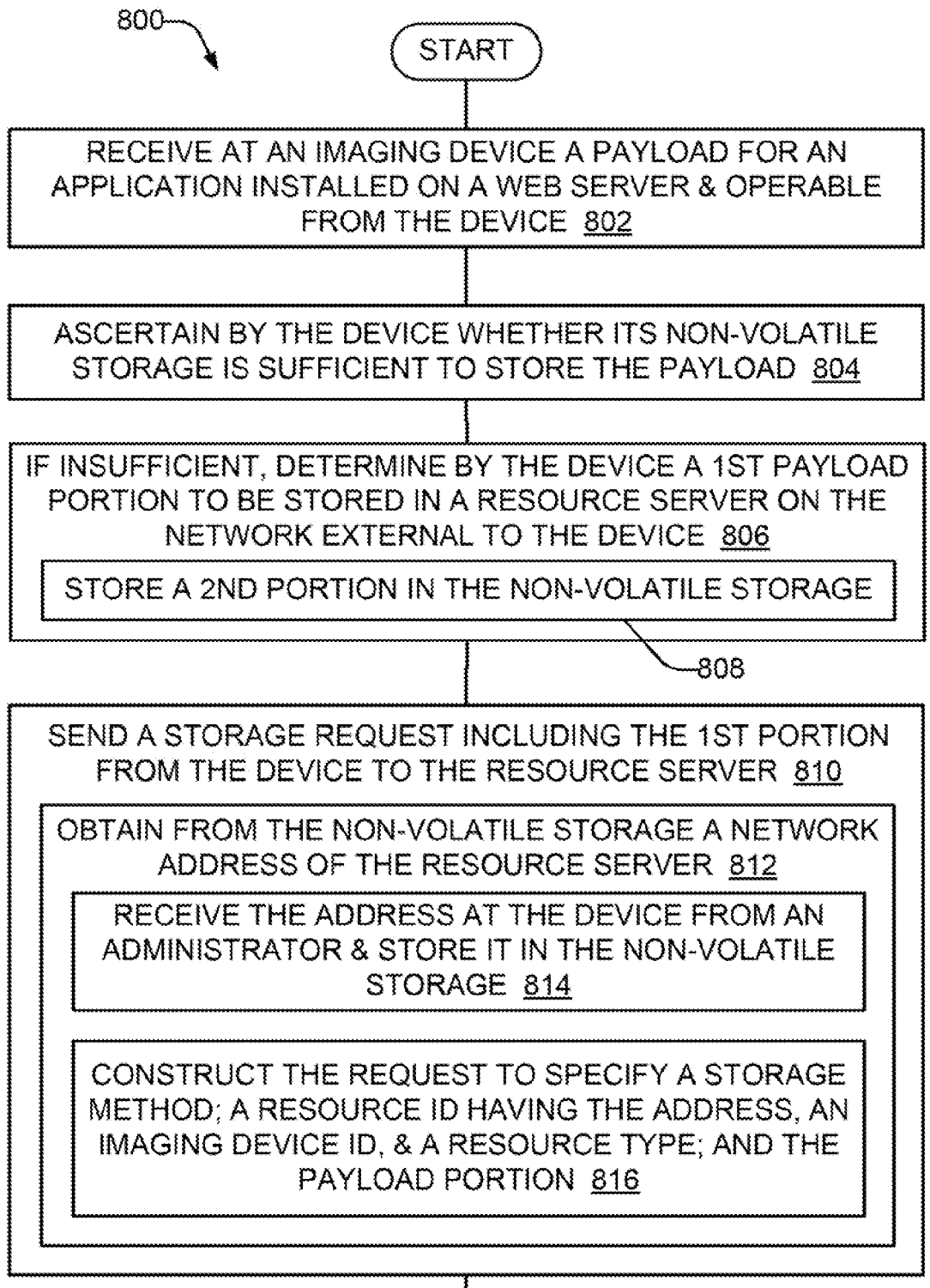
FIG. 8 is a flowchart in accordance with an example of the present disclosure of a method of operating an imaging device.

Consider now, with reference to FIG. 8, a flowchart of the operation of an imaging device. Alternatively, the flowchart of FIG. 8 may be considered as steps in a method of operating an imaging device. One or more various computing devices or processors may perform some or all of the steps of the method in the form of non-transitory computer-readable and -executable instructions stored in a memory that is part or and/or accessible by the computing device or processor.

The method 800 begins, at 802, by receiving at the imaging device over a network a payload for an application on a web server. The application is operable from the imaging device once it has been registered with the imaging device. At 804, it is ascertained by the imaging device whether non-volatile storage in the imaging device is sufficient to store the payload. At 806, if the non-volatile storage in the imaging device is insufficient to store the payload, then the imaging device determines a portion of the payload to be stored in a resource server external to the imaging device on the network. In some examples, at 808, another portion of the payload may be stored in the non-volatile storage.

At 810, a storage request including the portion of the payload is sent from the imaging device to the resource server. In some examples, at 812, a network address of the resource server is obtained from the non-volatile storage. In some examples, block 812 includes, at 814, receiving the resource server address at the imaging device from an administrator, and storing the received address in the non-volatile storage. In some examples, block 812 includes, at 816, constructing the storage request to specify (a) a storage method, (b) a resource identifier having a concatenation of the address, an identifier of the imaging device, and a resource type, and (c) the portion of the payload. In some examples, the payload portion is stored by the resource server at a resource that corresponds to the concatenation.

In some examples of the method 800, the imaging device is an OXPd-enabled imaging device; the payload is a REST-protocol payload for an OXPd application; the resource server is a REST-protocol resource server; and the storage request uses a REST-protocol HTTP PUT or POST command.

Figure 9:
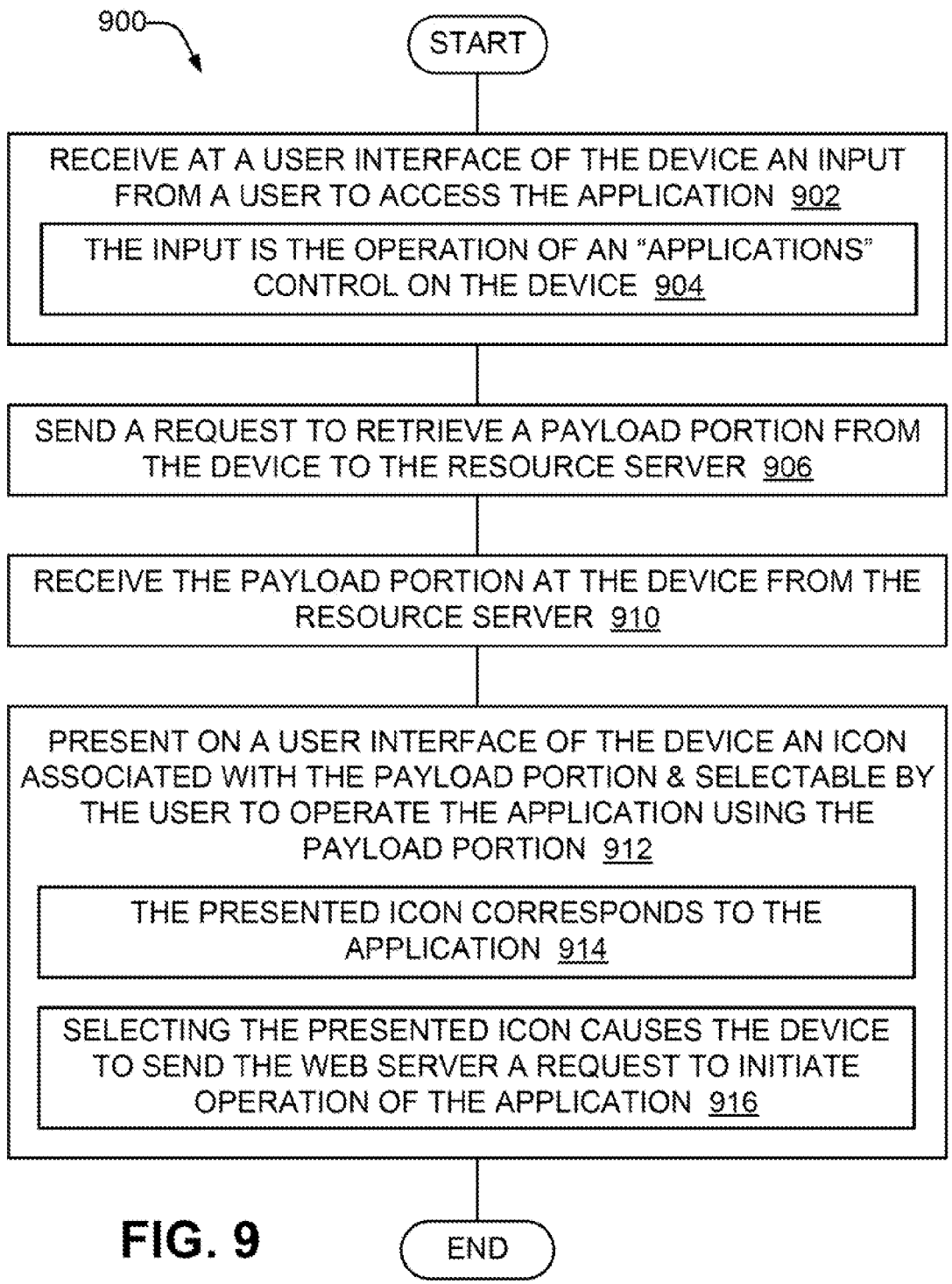
FIG. 9 is another flowchart in accordance with an example of the present disclosure of a method of operating an imaging device.

Consider now, with reference to FIG. 9, another flowchart of the operation of an imaging device. Alternatively, the flowchart of FIG. 9 may be considered as steps in a method of operating an imaging device. One or more various computing devices or processors may perform some or all of the steps of the method in the form of non-transitory computer-readable and -executable instructions stored in a memory that is part or and/or accessible by the computing device or processor.

The method 900 begins, at 902, by receiving at a user interface of the imaging device an input from a user to access the application. In some examples, at 904 the input from the user is the operation of an Applications control on the device. At 906, a request to retrieve a payload portion is sent from the device to the resource server. In some examples, the payload portion corresponds to a payload portion stored on the resource server by the operation of method 800 (FIG. 8). At 910, the payload portion is received at the device from the resource server. At 912, at least one icon associated with the received payload portion is presented on a user interface of the device. The icon is selectable by the user to operate the application using the received payload portion. In some examples, at 914, the presented icon corresponds to the application. In some examples, at 916, selecting the presented icon causes the imaging device to send to the resource server a request to initiate operation of the web application.

In some examples of the method 900, the imaging device is an OXPd-enabled imaging device; the payload is a REST-protocol payload for an OXPd application; the resource server is a REST-protocol resource server; and the retrieval request uses a REST-protocol HTTP GET command.

Figure 10:
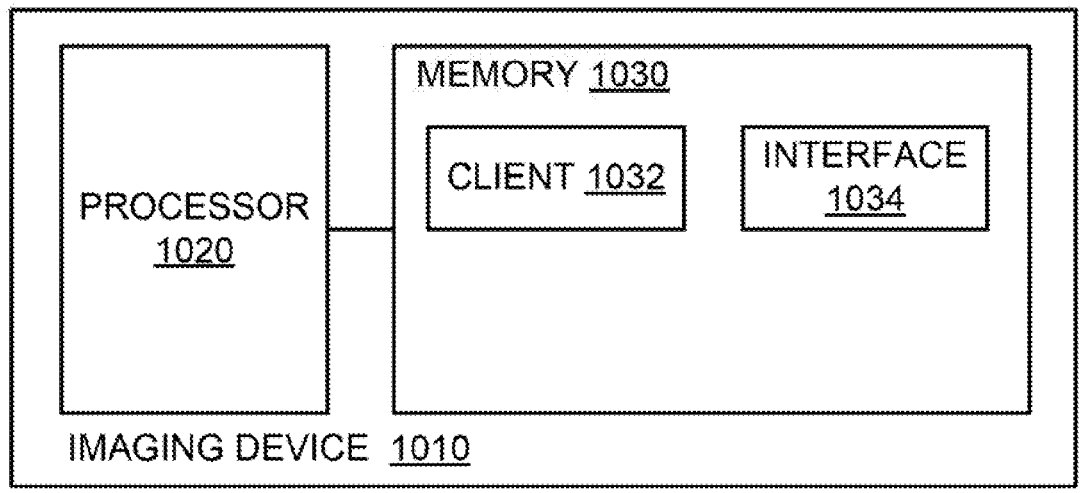
FIG. 10 is a schematic representation of processing subsystem usable in the imaging device of FIG. 2 or FIG. 3 and the resource server of FIG. 4 or FIG. 5 to execute the methods of FIGS. 8-9, in accordance with an example of the present disclosure.
Figure 10:
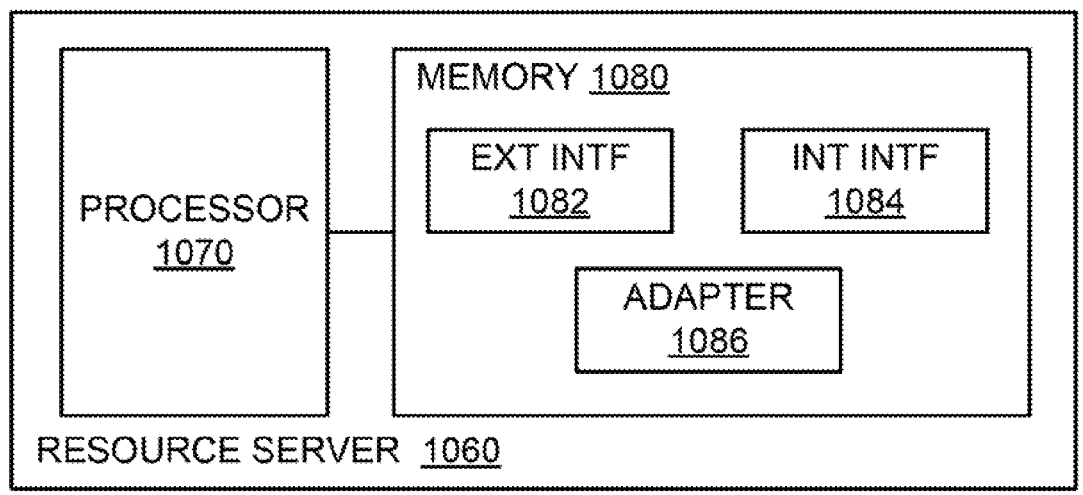

Considering now hardware architectures of an imaging device and a resource server usable with the methods 800, 900, and with reference to FIG. 10, an imaging device 1010 includes at least one processor 1020 that is communicatively coupled to at least one memory 1030. The memory 1030 is a non-transitory computer-readable storage medium on (or in) which instructions executable by the processor 1020 are, or can be, stored. In various examples, the instructions stored in a particular memory 1030 may correspond to at least a portion of the methods 800, 900. In some examples, the memory 1030 includes instructions that implement at least one client 1032 and at least one interface 1034. The client 1032 may in some examples correspond to the client 252 (FIG. 2) or clients 320 (FIG. 3). The interface 1034 may in some examples correspond to the interface 242 (FIG. 2) or APIs 310 (FIG. 3).

A resource server 1060 includes at least one processor 1070 that is communicatively coupled to at least one memory 1080. The memory 1080 is a non-transitory computer-readable storage medium on (or in) which instructions executable by the processor 1070 are, or can be, stored. In various examples, the instructions stored in a particular memory 1080 may correspond to at least a portion of the methods 800, 900. In some examples, the memory 1080 includes instructions that implement at least an external interface 1082, an internal interface 1084, and a protocol adapter 1086. The external interface 1082 may in some examples correspond to the external interface 468 (FIG. 4) or the external API 520 (FIG. 5). The internal interface 1084 may in some examples correspond to the internal interface 464 (FIG. 4) or the internal API 514 (FIG. 5). The protocol adapter 1086 may in some examples correspond to the protocol adapter 466 (FIG. 4) or NodeJS protocol adapter 530 (FIG. 5).

From the foregoing it will be appreciated that the imaging device, resource server, and methods provided by the present disclosure represent a significant advance in the art. Although several specific examples have been described and illustrated, the disclosure is not limited to the specific methods, forms, or arrangements of parts so described and illustrated. For example, examples of the disclosure are not limited to imaging devices, and are more broadly applicable to other types of electronic devices. This description should be understood to include all novel and non-obvious combinations of elements described herein, and claims may be presented in this or a later application to any novel and non-obvious combination of these elements. The foregoing examples are illustrative, and no single feature or element is essential to all possible combinations that may be claimed in this or a later application. Unless otherwise specified, steps of a method claim need not be performed in the order specified. Similarly, blocks in diagrams or numbers (such as (1), (2), etc.) should not be construed as steps that must proceed in a particular order. Additional blocks/steps may be added, some blocks/steps removed, or the order of the blocks/steps altered and still be within the scope of the disclosed examples. Further, methods or steps discussed within different figures can be added to or exchanged with methods or steps in other figures. Further yet, specific numerical data values (such as specific quantities, numbers, categories, etc.) or other specific information should be interpreted as illustrative for discussing the examples. Such specific information is not provided to limit examples. The disclosure is not limited to the above-described implementations, but instead is defined by the appended claims in light of their full scope of equivalents. Where the claims recite "a" or "a first" element of the equivalent thereof, such claims should be understood to include incorporation of one or more such elements, neither requiring nor excluding two or more such elements.

What is claimed is:

1. A networked, OXPd-enabled imaging device, comprising:
   a REST-protocol interface structured to receive over a network a payload for an OXPd application installed on an external web server;
   a non-volatile storage insufficient to store the payload;
   an address on the network of a REST-protocol resource server; and
   a client structured to use the resource server address to store at least a portion of the payload on the resource server using REST protocol.

2. The device of claim 1, comprising:
   a user interface structured to receive from a user an input to access the application; and
   wherein the client uses the resource server address to retrieve from the resource server at least a portion of the stored payload in response to the received input.

3. The device of claim 1,
   wherein the payload includes an address on the network of the application, and wherein the client is structured to use the application address to access the application.

4. The device of claim 1, wherein the payload includes
an icon associated with the application and displayable on a user interface of the device, and
an application network address usable by the client to access a predefined resource of the application when the icon is selected by a user via a user interface control of the device, the control associated with the icon.

5. The device of claim 1, comprising:
a controller structured to determine the portion of the payload to store on the resource server.

6. The device of claim 1,
wherein the application is operable on the external web server from a user interface of the imaging device.

7. A networked resource server, comprising:
a database suitable to store unstructured data;
an internal interface structured to access the database via an internal access request;
an external interface structured to receive an external access request to access the database from a networked imaging device, the request corresponding to at least a portion of a payload for an application on a web server, the payload sent to the imaging device from another source; and
a protocol adapter structured to convert the external access request to the corresponding internal access request, wherein the protocol adapter is a NodeJS component deployed in the resource server without compilation which operates in an event-driven and non-blocking manner.

8. The resource server of claim 7, wherein:
the resource server is a REST-protocol resource server,
the external access request is a REST-protocol access request,
the internal access request is a non-REST-protocol access request,
the imaging device is an OXPd-enabled imaging device, and
the application is an OXPd application.

9. The resource server of claim 8, wherein the resource server is structured to receive at the external interface REST-protocol requests from a plurality of OXPd-enabled networked imaging devices.

10. The resource server of claim 8,
wherein the external access request comprises a HTTP POST, PUT, or GET command from the imaging device, the command including a predefined resource that identifies a corresponding resource in the database.

11. The resource server of claim 7, comprising:
a rerouting service coupled to the external interface and structured to
determine that the resource server is unavailable to process the external access request received at the external interface, and
re-route the received request through the external interface to a different networked resource server.

12. The resource server of claim 7, comprising:
a reporting function coupled to the external interface and structured to
process a message received at the external interface from the imaging device having statistics related to an imaging job completed by the imaging device, and
send through the external interface a message derived from the statistics to at least one subscribed networked agent.

13. A method of operating an imaging device, wherein the imaging device is an OXPd-enabled imaging device, comprising:
receiving at the device over a network a REST-protocol payload for an OXPd application on a web server, the application operable from the device;
ascertaining by the device whether non-volatile storage in the device is sufficient to store the payload;
if the non-volatile storage in the device is insufficient to store the payload, determining by the device a portion of the payload to be stored in a REST-protocol resource server external to the device on the network; and
sending a REST-protocol storage request including the portion of the payload from the device to the resource server.

14. The method of claim 13, comprising:
obtaining from the non-volatile storage a network address of the resource server; and
constructing the storage request to specify
a storage method,
a resource identifier comprising a concatenation of the address, an identifier of the imaging device, and a resource type, and
the portion of the payload.

15. The method of claim 14, comprising:
receiving the resource server address at the device from an administrator; and
storing the received address in the non-volatile storage.

16. The method of claim 13,
receiving at a user interface of the device an input from a user to access the application;
sending a request to retrieve the payload portion from the device to the resource server; and
receiving the payload portion at the device from the resource server; and
presenting on a user interface of the device at least one icon associated with the received payload portion, the icon selectable by the user to operate the application using the received payload portion.

17. The method of claim 16,
wherein the input from the user is the operation of an Applications control on the device;
wherein the presented icon corresponds to the application; and
wherein selecting the presented icon causes the device to send to the server a request to initiate operation of the application.

* * * * *